(12) United States Patent
Stern

(10) Patent No.: US 6,661,521 B1
(45) Date of Patent: Dec. 9, 2003

(54) DIFFUSE SURFACE ILLUMINATION APPARATUS AND METHODS

(75) Inventor: Howard Stern, Greenlawn, NY (US)

(73) Assignee: Robotic Vision Systems, Inc., Nashua, NH (US)

( * ) Notice: Subject to any disclaimer, the term of this patent is extended or adjusted under 35 U.S.C. 154(b) by 0 days.

(21) Appl. No.: 09/151,765

(22) Filed: Sep. 11, 1998

(51) Int. Cl.⁷ .............................. G01N 21/47; G06K 9/22
(52) U.S. Cl. ...................... 356/446; 356/445; 356/121; 235/462.42; 235/462.45; 235/469; 235/472.01
(58) Field of Search ................................ 356/244, 121, 356/122, 445, 446, 256; 235/455, 462.42, 462.45, 469, 472.01; 362/252

(56) References Cited

U.S. PATENT DOCUMENTS

| | | | |
|---|---|---|---|
| 3,614,225 A | * 10/1971 | Dinella et al. ................. 355/85 |
| 4,044,708 A | * 8/1977 | Klein .......................... 116/328 |
| 4,628,464 A | * 12/1986 | McConnell .................. 382/153 |
| 5,011,244 A | * 4/1991 | Smith et al. ................ 350/3.75 |
| 5,136,145 A | * 8/1992 | Karney ....................... 235/475 |
| 5,433,295 A | * 7/1995 | Murphy ....................... 187/397 |
| 5,697,699 A | * 12/1997 | Seo et al. .................... 362/252 |
| 5,803,592 A | * 9/1998 | Lawson ....................... 362/300 |
| 6,033,087 A | * 3/2000 | Shozo et al. ................. 362/244 |
| 6,033,090 A | * 3/2000 | Seo ............................. 362/252 |
| 6,105,869 A | * 8/2000 | Scharf et al. ................ 235/454 |

* cited by examiner

Primary Examiner—Frank G. Font
Assistant Examiner—Roy M. Punnoose
(74) Attorney, Agent, or Firm—Morris I. Pollack

(57) ABSTRACT

An illumination apparatus is provided for a hand-held imager preferably to provide diffuse illumination for encoded symbology carried directly upon an article (component, etc) or upon a substrate carried by an article. The illumination apparatus is disposed proximate the front of the hand-held imager and is configured to permit light reflected from the target to pass through the illumination apparatus and onto a CCD image receiver. An array of unlensed LED's is disposed to cast approximately or substantially lambertian illumination in a direction away from the target to be imaged and into the hand-held housing to impinge upon surfaces of an illuminator to receive the illumination and, in turn, project efficient and diffuse dark field illumination through the array of unlensed LED's and towards and onto a location where a target to be imaged would be disposed. The illumination apparatus further includes a bright field illumination source including a plurality of forward facing (towards the target) lensed LED's.

67 Claims, 7 Drawing Sheets

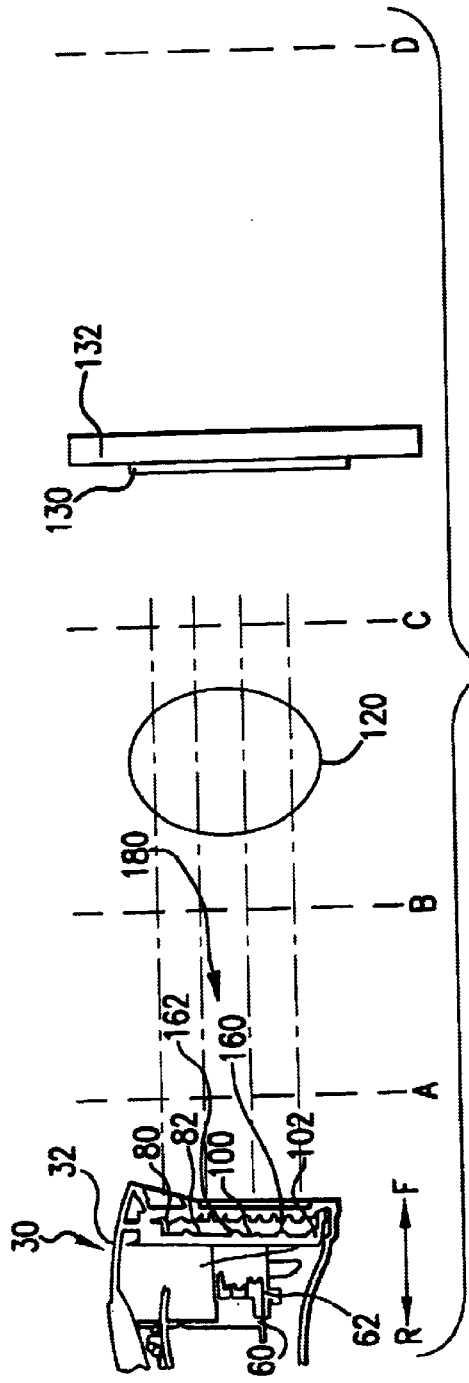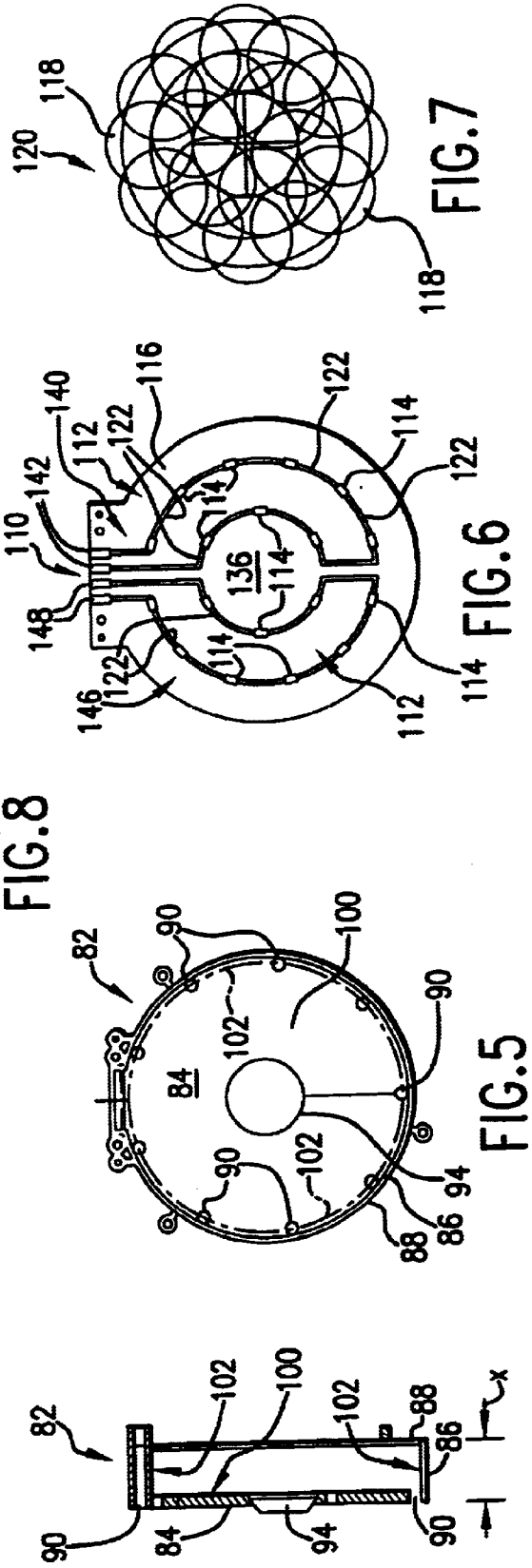

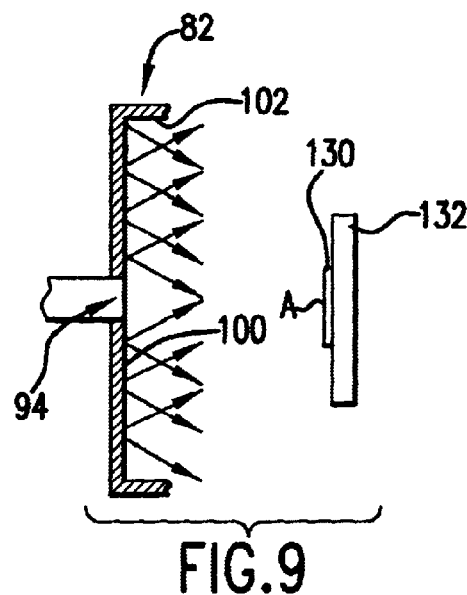
FIG. 9
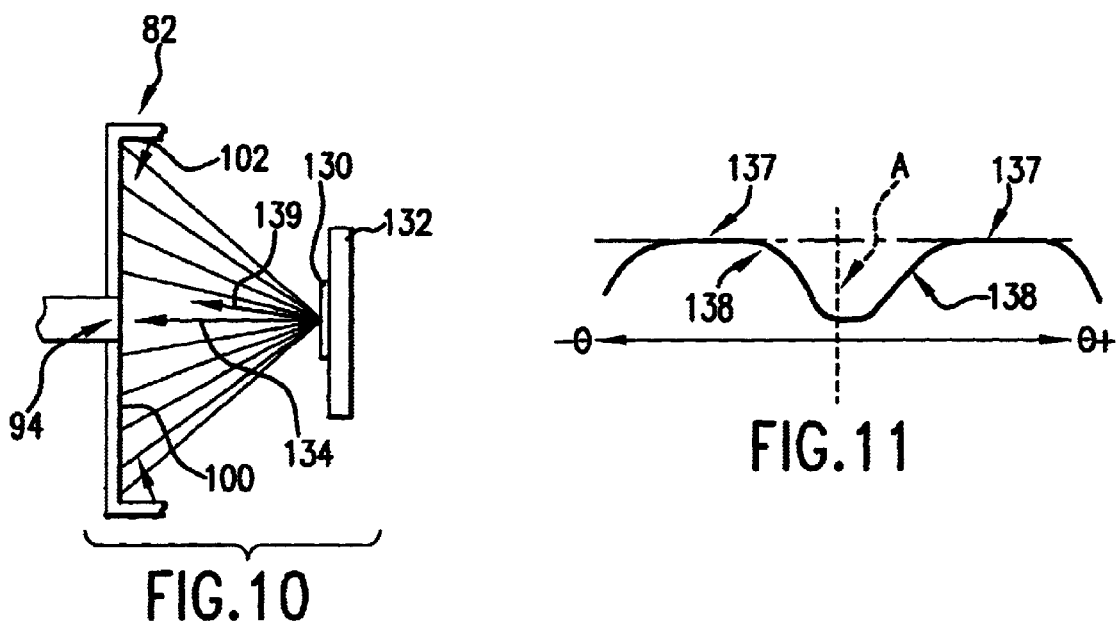
FIG. 10
FIG. 11

DIFFUSE SURFACE ILLUMINATION APPARATUS AND METHODS

BACKGROUND OF THE INVENTION

1. Field of Use

This invention relates to the uniform illumination of surfaces, which may be specular or irregular, and more particularly, to the uniform illumination of machine readable codes, symbologies and the like that may be applied to such surfaces, to facilitate imaging and decoding of any such symbology applied directly to such surfaces or to media that is, in turn, applied to such surfaces.

2. Description of the Prior Art

It is quite often necessary to determine the existence, location or characteristics of an article through automated means for automated purposes. Robotic handling of parts for processing such as machining or assembly purposes and automated sorting, transportation, manipulation and other handling of parts, components, packages and the like usually requires that some form of machine readable code or symbology be applied to the article. U.S. Pat. No. 5,567,927 patented to R. W. Kahn on Oct. 22, 1996 for "Apparatus For Semiconductor Wafer Identification" and U.S. Pat. No. 5,631,456 patented to K. L. Kost on May 20, 1997 for "Reflection Control Apparatus" are exemplary of such product marking. At times it is convenient to apply the symbology to a media such as a pressure sensitive label. Other times it is more desirable and possibly efficient to apply the symbology directly to the article. The symbology may be a conventional bar code, a stacked bar code or other 2-D symbology.

Machine reading of symbology, as by a stationary or hand-held reader or imager, requires proper illumination of the targeted symbology. This may present problems if the media carrying the symbology is applied to an irregular or curved surface. The problems are more pronounced if the symbology is applied directly to the article and the article surface is normally specular and/or the article's surface is irregular.

When the symbology reader or imager is to be hand-held it is usually most desirable to minimize its size and weight. To do so while at the same time providing for uniform and diffuse illumination for the symbology may and has created problems.

Some hand-held symbology readers, such as that shown and described in U.S. Pat. No. 4,818,856 patented to T. Matsushima et al. On Apr. 4, 1989 for "Optical Information Reading Apparatus", attempt to effect reading of the symbology with ambient light; but, since ambient light is not always sufficient to facilitate symbology reading such devices may be unacceptable. Other hand-held symbology readers, such as those shown and described in U.S. Pat. No. 5,349,172 patented to A. Roustaei on Sep. 30, 1994 for "Optical Reading Head" and in U.S. Pat. No. 5,378,883 patented on Jan. 3, 1995 to E. P. Batterman et al for "Omnidirectional Wide Range Hand-Held Bar Code Reader", provide their respective LED or Xenon tube illumination either directly through a window of the reader or through lenses and then directly through a reader window. The resulting illumination of the symbology may thus be irregular and not diffuse and, as such, unacceptable.

Other hand-held symbology readers, such as those shown and described in U.S. Pat. No. 5,530,233 patented to M. Krichever on Jun. 25, 1996 for "Bar-Code Scanner With Quasi-Retroreflective Light Collection" and in U.S. Pat. No. 5,468,949 patented on Nov. 21, 1995 to J. Swartz et al, for "Portable Laser Diode Scanning Head", direct their respective laser sources of illumination into the hand-held devices. However, these devices also incorporate motor driven mirrors to scan the illumination across the symbology. Laser illumination reflected off a specular mirror surface is neither diffuse nor uniform and the use of mirrors and motors add unacceptable weight and cost to the device. Other hand-held devices, such as those shown and described in U.S. Pat. No. 5,602,376 patented to E. P. Coleman on Feb. 11, 1997 for "Hand-Mounted Optical Scanner System" utilize laser illumination with two mirrors, one of which is rotated; or as shown and described in U.S. Pat. No. 5,184,004 patented to S. Uede on Feb. 2, 1993 for "Optical Code Reader" utilize an inwardly facing light source and a pair of mirrors with specular surfaces, are also unacceptable for the intended uses for the above reasons.

U.S. Pat. No. 5,187,611 patented on Feb. 16, 1993 to T. P. White et al for "Diffuse On-Axis Light Source"; U.S. Pat. No. 5,585,616 patented on Dec. 17, 1996 to D. L. Roxby et al for "Camera For =Capturing And Decoding Machine-Readable Matrix Symbol Images Applied to Reflective Surfaces"; and U.S. Pat. No. 5,313,373 patented on May 17, 1994 to J. A. S. Bjorner et al for "Apparatus For The Uniform Illumination Of A Surface" all direct their respective sources of illumination generally towards the target to be illuminated. The alleged diffuse and uniform illumination requires incorporation of diffusing members which unacceptably absorb light and reflect some light back into the device. Diffusers, furthermore, add weight and cost to the devices. White et al additionally requires beam splitters; while Roxby et al, must utilize a head with a white matte finish interior surface to diffuse ambient light reflected off the symbology and into the device towards the sensor, and Bjorner et al must utilize a shroud with inside surfaces that are both black and white. A. Brandorff et al, in U.S. Pat. No. 5,408,084 patented on Apr. 18, 1995 for "Method And Apparatus For Illuminating And Imaging Of A Surface Using 2-D LED Array", also incorporates a shroud but one with a specular, thin aluminum reflective inner surface; while Y. Sakai et al, in U.S. Pat. No. 5,572,008 patented on Nov. 5, 1996 for "Optical Information Reading Apparatus With Concave Mirror" directs the laser illumination up towards a concave mirror then to a rotating mirror and then to a pattern mirror all of which unacceptably affect their respective devices.

U.S. Pat. No. 5,325,276 patented to K. Sullivan on Jun. 28, 1994 for "Lighting Apparatus For The Computer Imaging Of A Surface" and U.S. Pat. No. 5,461,417 patented on Oct. 24, 1995 to T. P. White et al for "Continuous Diffuse Illumination Method And Apparatus" respectively must utilize walls with electroluminescent panels and a dome that is backlit by two light sources to accomplish their intended target illumination. While J. B. Powers et al in U.S. Pat. No. 5,623,137 patented on Apr. 22, 1997 for "Illumination Apparatus for Optical Readers", is not specific as to the direction the illumination source faces but does utilize complex configured specular mirrors to direct the illumination towards the symbology; and K. L. Kost et al, previously mentioned, requires a circle of LED's facing inwardly to illuminate the white walls of an upper chamber. However, the resulting illumination must find its way through a relatively small opening leading from that chamber. Because of that relatively small opening the Kost et al device is not suitable for illuminating a symbology with diffuse light from a wide range of angles while retaining a small size apparatus.

SUMMARY OF THE INVENTION

It is therefore an object of this invention to provide new and novel surface illumination apparatus.

It is another object of this invention to provide new and novel methods of surface illumination.

It is yet another object of this invention to provide new and novel diffuse, high efficiency illumination of surfaces which carry machine readable coded information.

It is another object of this invention to provide new and novel illumination of specular and otherwise irregular surfaces upon which there is disposed machine readable coded symbology.

It is yet still another object of this invention to provide new and novel apparatus and methods for hand-held illumination of machine readable coded symbology.

It is a further object of this invention to provide new and novel apparatus and methods for hand-held, diffuse, high efficiency, illumination of machine readable coded symbology.

It is yet a further object of this invention to provide new and novel apparatus and methods for hand-held illumination of machine readable, coded symbology applied directly to parts and components.

It is yet still a further object of this invention to provide new and novel apparatus and methods for casting or projecting illumination from a uniformly radiating wall upon machine readable coded symbology.

It is yet still a further object of this invention to provide new and novel apparatus and methods for directing an area of illumination or a wall of illumination upon parts, components and the like to facilitate automated processing thereof.

It is yet still a further object of this invention to provide new and novel apparatus and methods for applying illumination to symbology carried by parts, components and the like to facilitate decoding of the symbology.

It is yet a further object of this invention to provide new and novel hand-held apparatus and methods for applying diffuse, high efficiency, uniform illumination to symbology directly applied to parts, components and the like to effect decoding of the symbology.

It is yet still another object of this invention to provide new and novel arrangements of light emitting diodes to provide diffuse, high efficiency illumination.

It is yet still another object of this invention to provide new and novel arrangements of light emitting diodes for hand-held imagers of symbology.

Other objects, features and advantages of the inventions in their methods and details of construction and arrangement of parts will be seen from the above, from the following description of the preferred embodiments when considered with the drawings and from the appended claims.

BRIEF DESCRIPTION OF THE DRAWING

In the drawing:

FIG. 4 is a side elevation sectional view of the illuminator of the illumination assembly for the imager of FIGS. 1 and 2, with the illumination source removed to better show details thereof;

FIG. 5 is a front elevation view of the illuminator of FIGS. 1, 3 and 4;

FIG. 6 is a plan view of the illumination source for the illuminator of FIGS. 1, 3, 4 and S for the hand-held imager of FIGS. 1 and 2;

FIG. 7 is a schematic diagram showing the distribution of illumination upon and emanating from the illuminator of FIGS. 1, 3, 4 and 5;

FIG. 8 is a schematic of the illuminator and illumination source of FIGS. 1–7 disposed in relationship to a target;

FIG. 9 is a schematic showing of the illumination from the illuminator of FIGS. 1 and 3–5 in relationship to a symbology target;

FIG. 10 is a schematic further showing the illumination from the illuminator of FIGS. 1, 3–5 and 8 in relationship to the symbology target;

FIG. 11 is a diagrammatic showing of an illumination curve for "dark field" illumination from the illuminator of FIGS. 1 and 3–5;

DESCRIPTION OF THE PREFERRED EMBODIMENT

Figure 1:
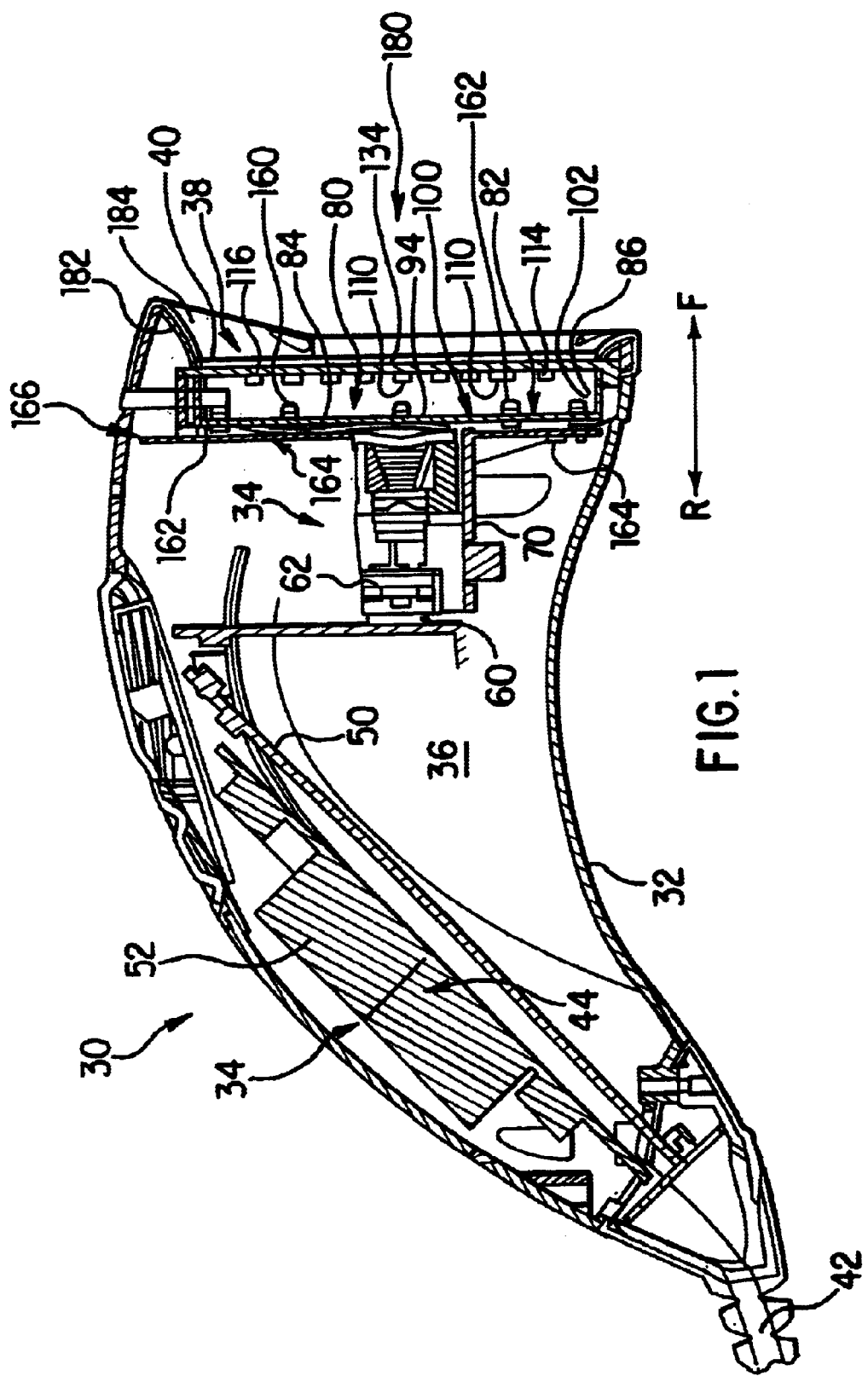
FIG. 1 is a schematic side elevation view, in partial section, of a hand-held imager incorporating illumination apparatus, which utilizes methods, and incorporates the instant invention.
Figure 2:
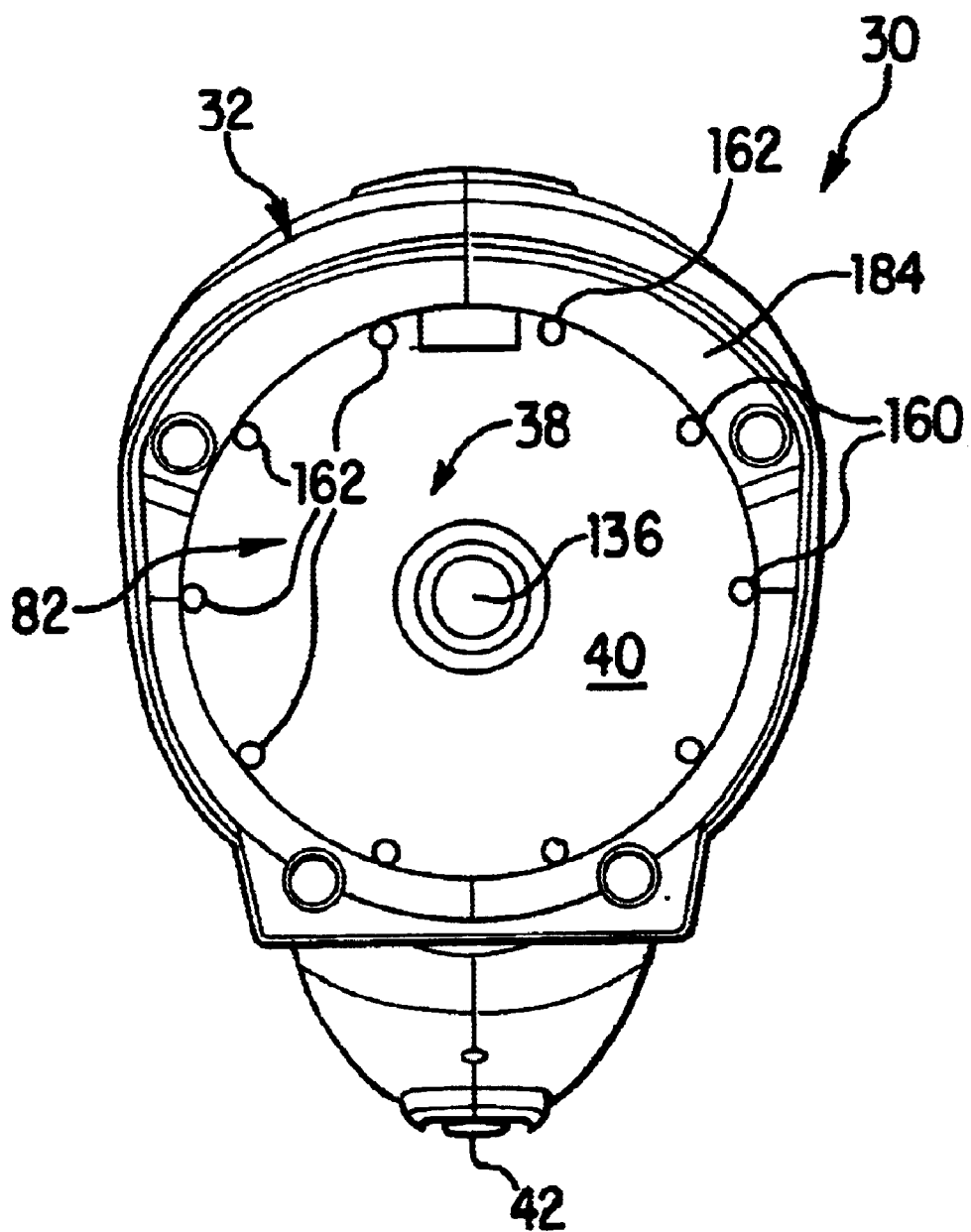
FIG. 2 is a schematic front elevation view of the imager of FIG. 1.
Figure 3:
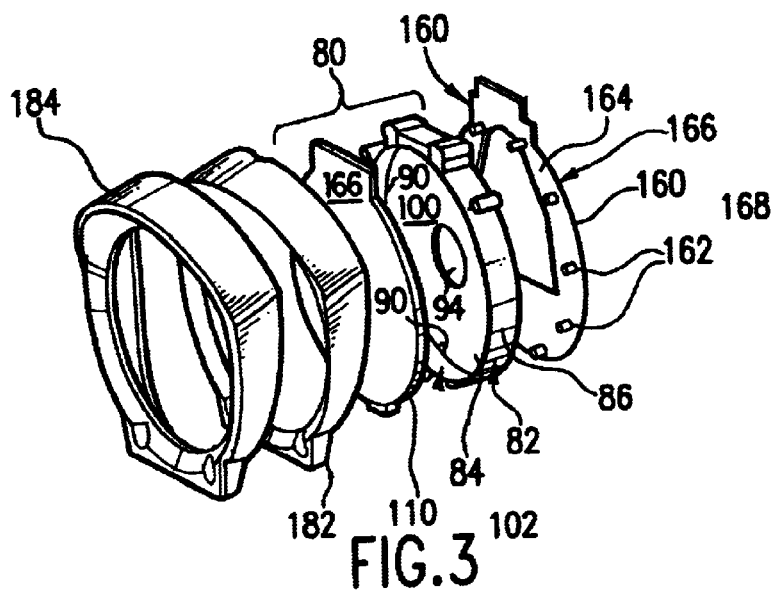
FIG. 3 is a perspective schematic of the illumination assembly of the imager of FIGS. 1 and 2 with front cover and bezel, exploded to better show details thereof.

With reference to FIGS. 1 and 2, there is generally shown at 30 an imager or imaging device of the type which electronically captures images of symbology, such as that of bar codes, stacked bar codes and 2-D (dimensional) codes or symbols, and converts the captured image into decoded electronic signals with decoded values passed out to a data gathering apparatus. Such signals may be thereafter decoded and further processed and/or utilized within the imager and/or transmitted to signal processing apparatus for decoding, storage and/or use for accounting, inventory, material handling, manufacturing processes or the like and/or such further processing may be accomplished in whole or in part within imager 30 or such processing apparatus. While a housing 32 for imager 30 has been configured and constructed as one for a hand-held imager it may just as well be mounted for stationary use or it may be otherwise constructed and configured so that the components and assemblies therewithin are mounted within a stationary housing. Housing 32 is constructed and configured to mount and enclose imaging components 34 within a space 36 having an opening 38 that is closed, in whole or in part, by a window 40. An electrical conduit 42 extends from an electronic package 44 (FIG. 1), through housing 32 for interconnection with signal processing apparatus when signal processing and decoding is not accomplished by package 44 and with associated apparatus for supplying input power and control and other electronic signals to imager 30 when and if required. It is also quite possible to construct imager 30 to be battery powered without conduit 42 so that the signals generated therewithin from the captured images, and signals to be received by imager 30, are otherwise transmitted, as by radio frequency, between storage and utilization apparatus and imager 30.

Electronic package 44, mounted within housing 32 by suitable and conventional components, in turn mounts and includes by way of example, a CPU board 50 and a power board 52, as well as other associated components, connectors, printed circuits and electrical connections. Electronic package 44 may be otherwise mounted within housing 30 and may include additional and/or other components for generating appropriate output signals depending upon the signals received from an image receiving device 60 (FIG. 1) and/or otherwise processed within imager 30. Image receiving device 60 includes a CCD (charge coupled device), but may instead utilize a CMOS (complimentary metal oxide semi-conductor) or similar device for receiving an image from symbology carried by an article. A suitable filter or filter package 62 is positioned proximate image receiving device 60 and together with device 60, and other components (lenses, etc.), provide a camera engine 70 for imager 30. Camera engine 70 is mounted within housing 32 and is positioned therein to receive a clear and well defined image of symbology for further processing within imager 30.

It is most important that imaging device 30 receive the best defined image possible. To accomplish that it is extremely important that the symbology to be imaged not only be in focus for imaging device 30 but also that illumination for and of the symbology be uniform and preferably diffuse over the entire area of the symbology. Camera engine 70 is configured and constructed, and includes appropriate and conventional lenses, to accomplish focusing of the symbology onto image receiving device 60. An illumination assembly 80 is mounted within housing 30 proximate window 40 thereof to illuminate the symbology to be imaged.

Illumination device 80 (FIG. 1) includes an illuminator 82 (FIGS. 1–5) which is substantially cup or bowl shaped in configuration and includes a base 84 (FIGS. 1, 3, 4 and 5) and a perimeter wall 86 extending at right angle to base 84 for a predetermined distance "x" (FIG. 4) to terminate at a perimeter edge 88. A plurality of first openings 90 (FIGS. 4 and 5) extend through base 84 proximate wall 86. While nine such openings 90 are shown more or less openings may be utilized. A central opening 94, which extends through base 84 at the center thereof, is preferably concentric with perimeter wall 86. When assembled within housing 32 of imager 30 central opening 94 of illuminator 82 is aligned with the optical lenses of camera engine 70 to permit the illuminated symbology image to be cast upon image receiving device 60.

An inner surface 100 of base 84 of illuminator 80 and an inner surface 102 of perimeter wall 86 thereof are finished in either smooth red or white, rough chrome, matte finish white or in any other manner so that an approximately lambertian, or substantially lambertian, output illumination pattern is effected and projected out from every point on the respective surfaces 100, 102 that are illuminated, as will be hereinafter explained.

While perimeter wall 86 is shown and described as extending from base 84 at a 90 degree angle it should be understood that perimeter wall 86 may just as well meet base 84 at other suitable angles and that illuminator 82 may alternatively be formed with a dish-like shape wherein the base and side wall curve into one another with a selected slope such as one might find in a parabolic dish.

An illumination source 110 (FIGS. 1, 3 and 6) is provided to cast illumination towards and upon surfaces 100 and 102 respectively of illuminator 82. An array 112 (FIGS. 1 and 6) of illumination devices, such as surface mounted unlensed light emitting diodes (LED's) 114, are mounted to an illumination carrier 116 (FIGS. 1, 3 and 6) which is, in turn, secured in place within housing 32 and against beveled peripheral edge 88 of illuminator 82 by conventional means and as shown in FIGS. 1 and 8. LED's 114 are secured to carrier 116 and positioned thereon in array 112 so that each LED 114 of array 112, when illuminated, will cast substantially lambertian or focused illumination, upon surfaces 100, 102 of illuminator 82. The illumination 118 (FIG. 7) so cast by each LED 114 (FIGS. 1, 6 and 8) will effect an approximately lambertian output illumination pattern ( maximum energy is cast forward, on axis, and decreasing amounts of energy are cast in increasingly off axis directions) and will overlap illumination 118 of adjacent LED's 114 as shown in FIG. 7; except for a central space 119 so that illumination does not shine into the lenses of camera engine 70. Illumination 118 from LED's 114 which strike surface 102 of perimeter wall 86 will be directed back into illuminator 82 and against surface 100 of base 84 to further enhance and add efficiency to illumination 118. Surfaces 102 may be covered with retroreflective material, such as reflective material used for reflective traffic signs and license plates and manufactured by 3M, to enhance the amount of light that is returned to surface 100. All the various illumination components 118 together will provide an area of illumination 120 (FIG. 7) which is projected from illuminator 82 and illumination device 80 towards and upon symbology to be imaged, such as a target 130 (FIGS. 8, 9 and 10). Target 130 is carried by a surface 132 which may be the wall of a package or an outer surface of a part, component, sub-assembly, or assembly.

Illumination carrier 116 (FIGS. 3 and 6) may have its surface coated in selected areas with transparent conductive material to electrically interconnect unlensed LED's 114, or LED's 114 may otherwise be electrically interconnected by relatively thin lines of conductive ink or wire 122 (FIG. 6). LED's 114 and any electrical conductors 122 utilized to interconnect LED's 114 into an electrical circuit are selected to be small enough so that any shadow of same that might appear on symbology 130 (FIGS. 8–10) will be out of focus when imager 30 is in focus with respect to a particular target 130. Thus any shadow image of any such wires 122 and LED's 114 will be "smeared" out and not affect the image of target 130 that is cast upon image receiving device 60.

Imaging and decoding a 1-D or 2-D symbology requires that the ones and zeros of the symbology be discernable for the decoding algorithms, which, in turn, requires that proper contrast between the ones and zeroes be obtained during the imaging process. Particularly when imaging a 2-d symbology, it is not important whether the ones are dark or light with respect to the zeroes; it is only important that the contrast between the two states is sufficient for adequate separation. For example, when the symbology is printed as a black code on a white background or as a white code on a black background, the code will be easily discernable in almost any illumination if the code and the background are both surfaces having a matte reflectivity. The matte surfaces ensure that regardless of the direction from which they are illuminated, the light reflected from them will be smoothly distributed over a wide angular distribution and so will provide adequate illumination into the camera lens. This situation is usually achieved when the symbologies are printed on labels that are affixed to parts or components. However, labels are easily tampered with and often fragile compared to the parts or components to which they are attached. Therefore, it is often advantageous to mark the symbology directly on the parts or components. Unfortunately, parts and components often have specular (mirror like) surfaces which do not distribute the light uniformity over a wide angular distribution but rather redirect the light rays such that the angle of reflection is exactly equal to the angle of incidence. If the illumination comes from a small source (a source having a small angular extent as viewed from the specular surface being illuminated) it is highly likely that the light reflected from the surface will miss the camera lens and so the surface will appear to be "black". Conversely, if the small light source is positioned such that the angle of reflection directs the light rays from the source directly into the camera lens the light rays may be overwhelmingly bright and so make the surface appear to be "white". Thus, we have an intolerable situation because the surface may appear to be either "black" or "white" according to very small changes in the exact angular relationship between the specular surface being imaged, the light source, and the camera lens. This situation is especially deleterious when the symbology being imaged is on a surface that is simultaneously specular and curved so that some portions appear to be bright and other portions appear to be dark. The illumination system of the instant invention corrects this situation by providing a light source that provides a known and relatively constant illumination over a wide range of angles when illuminating close up (1.5 inches to 4 inches) symbologies. The principle of the illumination is shown in FIGS. 9, 10 and 11.

Diffuse illumination projected from illuminator surfaces 100, 102, will evenly illuminate "substantially all points" on symbology 130 (FIGS. 8–10) over a wide range of angles. Such illumination is useful both when illuminating specular and matte surfaces. When the relationship is as shown in FIG. 10 with the object 130 perpendicular to the camera axis none of the light rays from the illuminator that strike surface 130 will enter the camera lens if the surface is specular. It can be seen that light from any point on the illuminator surface 100 or 102 will bounce off of the mirror like surface and miss the lens. This occurs because the angle of reflection will always equal the angle of incidence and so direct light leaving any portion of the illuminator 100 or 102 back onto the symmetrically opposite portion of the illuminator. Of course, if the surface 130 were matte, the light impinging on surface 130 would be reradiated over a wide range of angles and so light energy would enter the camera lens. A map showing the rough distribution of light being received at a central point A on surface 130, versus angle of arrival is shown in FIG. 11. Note that the distribution is smooth over a wide angle except for a null, B in FIG. 11, corresponding to the fact that little or no light is emitted from the region of the central hole 94. The arrangement shown in FIG. 10 is ideal for imaging a specular part that has a matte symbology located on it. In this arrangement, the specular background will appear to be "black" and the "one" regions of the symbology, which may for instance be formed by data cells painted matte white will stand out as bright against the dark background. The matte "one" data cells may also be made of any other irregularity or disturbance of the specular surface (which reflects light over a wide range of angles) as may be formed by laser marking or peening with a tool. Of course, the codes may also be formed by marking so that the disturbed or "bright" areas are considered to be a "zero" and the black background formed by the specular surface may be considered to be the "ones". The foregoing illumination setup is known as "dark field" illumination because the specular background appears to be dark.

If a specular surface such as 130 in FIG. 10 is tilted slightly, in any direction from the position shown, say about 10 degrees, light from portions of the illuminator surfaces 100 and 102 will now be reflected directly into the camera lens so that the surface 130 will appear to be bright to the imager. The surface brightness as seen by the camera will appear to be approximately equal to the brightness of the illuminator. Any matte markings on the surface caused by a dark paint or peening or laser marking will now appear to be "dark" compared to the background. This will occur because the light directly reflected from the specular surface 130 will appear to be much brighter than the light that is scattered (only a small portion entering the camera lens) from the disturbance that may be used to define either a "one" or a "zero" portion of a symbology. When used off axis the illuminator provides a "bright field" illumination because the specular surface background appears to be brighter than the objects contained within.

It should be noted that the disposition of illumination carrier 116 positions array 112 of LED's 114 relatively close to illuminator base 84 thus allowing for a relatively thinner illumination component for imager 30 and a relatively more compact and efficient imager 30, then the prior art devices which utilize diffusers.

LED's 114 are selected to provide illumination in appropriate color and with an illumination potential appropriate for the targets to be illuminated by imager 30. To facilitate the approximately lambertian and wide range output of LED's 114 only unlensed LED's are utilized. The usual light reflector's, and covers provided for most LED's are not required for illumination source 110. LED's 114 are arranged on carrier 116 with twelve LED's 114 in an outer circle and six LED's 114 in an inner circle. A first circuit 140 (FIG. 6) of nine LED's 114 (six from the outer circle and three from the inner circle) and conductors 122 terminates at connectors 142; while a second similar circuit 146 of nine LED's 114 and conuctors 122 terminates at connectors 148. Circuits 140 and 146 may be activated separately, together or in sequence as described from suitable appropriate and conventional sources. Such illumination circuits may also be energized at various selected intensities and for selected time intervals to provide a desired brightness level and duration of illumination.

Illuminator 82 and illumination source 110 provide a "dark field" illumination device 80 for imager 30. Targets in a range up to approximately four (4) inches from imager 30 (specifically 1.5 inches to 4 inches; i.e. from "A" to "B"—FIG. 8) are considered to be in a "dark field" and best illuminated by diffuse illumination device 80. Illumination device 80 may also be utilized for targets in a mid-range (i.e. between "B" and "C" of FIG. 8); but illumination from device 80 when utilized for the mid-range may be supplemented by or replaced with, illumination from a "bright field" illumination device 160 (FIGS. 1–3 and 8) to be hereinafter described in greater detail. Targets disposed at distances greater than 8 inches (from "C" towards "D"—FIG. 8) are usually sufficiently illuminated by "bright field" illumination device 160; however, "dark field" illumination device 80 may still be utilized if additional illumination is required.

A plurality of "bright field" illumination devices 162 (FIGS. 1–3 and 8), which preferably comprise conventional lensed LED's, are carried by a "bright field" illumination carrier 164 and together therewith comprise a "bright field" illumination source 166. LED's 162 extend out from their carrier 164 and are disposed in a circle proximate the periphery of carrier 164 and through openings 90 (FIG. 4) of illuminator 82. An enlarged opening 168 (FIG. 3) is formed through carrier 164 and positioned so that when carrier 164 is disposed within housing 32 the optics of camera engine 70, and image receiving device 60, will be aligned with, and have an unobstructed disposition with respect to, central opening 94 of illuminator 82, and central area 136 (FIGS. 2 and 6) of "dark field" illumination carrier 116. Suitable, conventional and appropriate electrical conductors (not shown) are provided to carrier 164 and LED's 162 and interconnect LED's 162 to an appropriate source of electrical power and controls so that the brightness level and duration of illumination of LED's 162 may be suitably and selectively controlled. The nine LED's 162 shown for Wright field illumination device 160)are exemplary and either less or more LED's 162 may be utilized. Alternatively other suitable and appropriate illumination devices may be utilized in place of LED's 162 for bright field illumination device 160.

"Bright field" illumination device 160 and "dark field" illumination device 80 are respectively assembled into housing 32 and secured in position within housing 32 between camera engine 70 and window 40 of housing 32. The disposition of devices 160 and 80 within housing 32 is such as to establish a line of sight 180 (FIGS. 1 and 8) from target 130 (FIG. 8) through a central area of window 40, dark field carrier 116, central opening 94 of illuminator 82, the lenses of camera engine 70 and onto CCD image receiving device 60. Since "dark field" illumination carrier 116 is transparent and may serve to protect mechanisms within housing 32 from the entry thereinto of dirt, dust, liquid and other unacceptable matter window 40 may either comprise just an opening or a transparent cover of glass, plastic or the like. A bezel 182 (FIGS. 1 and 3) and a front cover 184 (FIGS. 1–3) close off the front of housing 32.

When "bright field" illumination device 160 is properly installed within housing 32 LED illumination devices 162 are disposed to direct their illumination forward (in the direction of arrow F—FIGS. 1 and 8) of housing 32 as explained in greater detail earlier in the description. When "dark field" illumination device 80 is properly installed within housing 32 LED illumination devices 114 are disposed to direct their illumination rearward (in the direction of arrow R—FIGS. 1 and 8) of housing 32 as explained in greater detail earlier in this description.

Figures 12, 13:
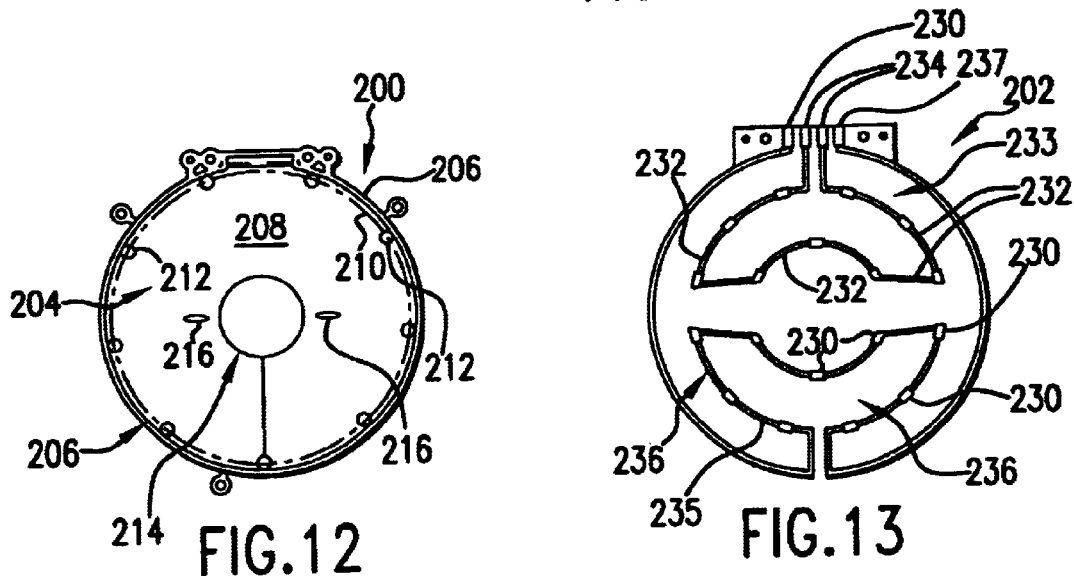
FIG. 12 is a front elevation view of an alternate embodiment of illuminator for the imager of FIGS. 1 and 2 incorporating the instant invention.
FIG. 13 is a plan view of an alternate embodiment of illumination source for the imager of FIGS. 1 and 2 incorporating the instant invention.

An alternative embodiment and construction of an illuminator 200 is shown in FIG. 12 and an illumination source 202 for cooperation with illuminator 200 is shown in FIG. 13. Illuminator 200 is also dish shaped (like illuminator 82 of FIG. 4) and includes a base 204 (FIG. 12) and side walls 206 with surfaces 208, 210 respectively that are finished like surfaces 100, 102 of illuminator 82 described earlier in this description. Illuminator 200 also includes openings 212, sized, disposed and for the same purpose as openings 90 of illuminator 82 (i.e. for "bright field" illumination LED's (not shown). A central opening 214, provided through base 204 of illuminator 200, is positioned the same as and for the same purpose as central opening 94 of illuminator 82. Elongated openings 216 are aligned with and provide openings for spotter or locating beams (not shown) which may, for example, comprise sources of laser illumination (not shown) which, when activated, generate a user observable spotter line across target 130. When the observable spotter line is not only on target but is also substantially the width of target 130 it indicates to the user of imager 30 that they are within the field of view for imager 30 and can continue operation of imager 30 to focus on and image target 130.

A plurality of unlensed LED's 230, carried by an illumination carrier 231, are provided as illumination devices for illumination source 202. Electrical conductors such as conductive strips, ink or wires 232 interconnect LED's 230 into either a first circuit 233 which terminates at connectors 234; while similar electrical conductors 235 interconnect LED's 230 into a second circuit 236 which terminates at connectors 237. Illumination source 202, carrier 231, LED's 230 and wires 232,235 are assembled and function as described for illumination source 110, carrier 116, LED's 114 and conductive wires 122 of illumination source 110 (FIGS. 1–8). Illumination source 202 furthermore is to be disposed proximate illuminator 200 and to cooperate therewith to provide highly diffuse light as described above for illumination device 80 (FIGS. 1–8).

Figures 14, 15:
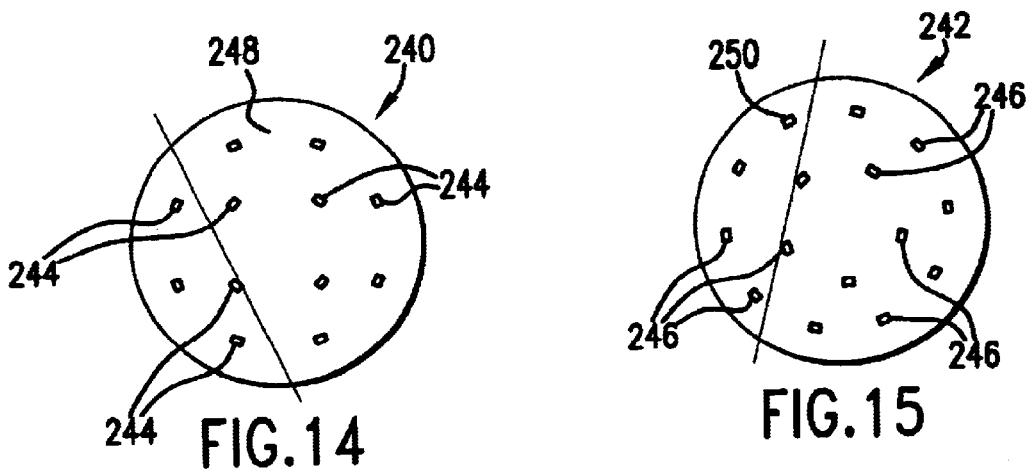
FIG. 14 is a schematic plan view of an alternative embodiment illumination source for the imager of FIGS. 1 and 2, incorporating the instant invention.
FIG. 15 is yet another plan view of an alternative embodiment illumination source for the imager of FIGS. 1 and 2, incorporating the instant invention.

FIGS. 14 and 15 show alternative illumination sources 240, 242 for an imager such as imager 30 and which incorporate the instant invention. Illumination sources 240, 242 are sized and configured for co-action with an illuminator such as illuminator 80 of the embodiment of FIGS. 1–8 or the illuminator 200 of the embodiment of FIG. 12. Each illumination source 240, 242 includes a plurality of illumination devices 244, 246 respectively, which preferably are unlensed LED's such as unlensed LED's 114 (FIG. 6) and unlensed LED's 230 (FIG. 10). Carriers 248, 250 respectively are fabricated from clear and transmissive (to the emitted LED wavelengths) material such as glass, plastic, etc., and may either be provided with electrically conductive but transparent conductors to unlensed LED's 244, 246 respectively or suitably conductive but relatively thin electrical conductors such as those shown and described at 122 (FIG. 6) and 232 (FIG. 13). Such conductors for LED's 244, 246 are also electrically connected to a source of electric power and to a suitable control to arrange LED's 244, 246 in either a single or plural selected circuits and to control the brightness and duration of illumination from sources 240, 242. The differences between illumination sources 240, 242 are that source 240 includes eight LED's 244 in an outer circle and four LED's in an inner circle; while source 242 includes ten LED's 246 in an outer circle and five LED's 246 in an inner circle. The illumination patterns provided by cooperation of illumination sources 240 and 242 with illuminators such as 82 (FIGS. 4 and 5) and 200 (FIG. 12) will be approximately or substantially lambertian and overlapping such as that shown in FIG. 7 and will provide diffuse target illumination such as 120 of the embodiment of FIGS. 1–8.

Figure 16:
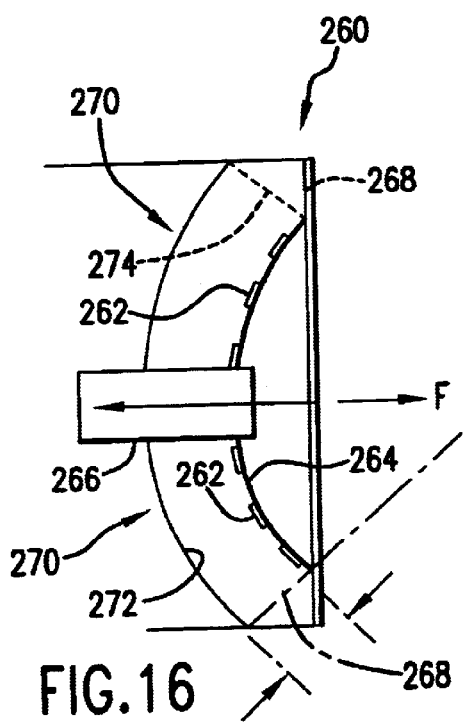
FIG. 16 is a schematic side elevation view of still another embodiment of illumination apparatus, incorporating the instant invention, for use with the imager of FIGS. 1 and 2.
Figure 17:
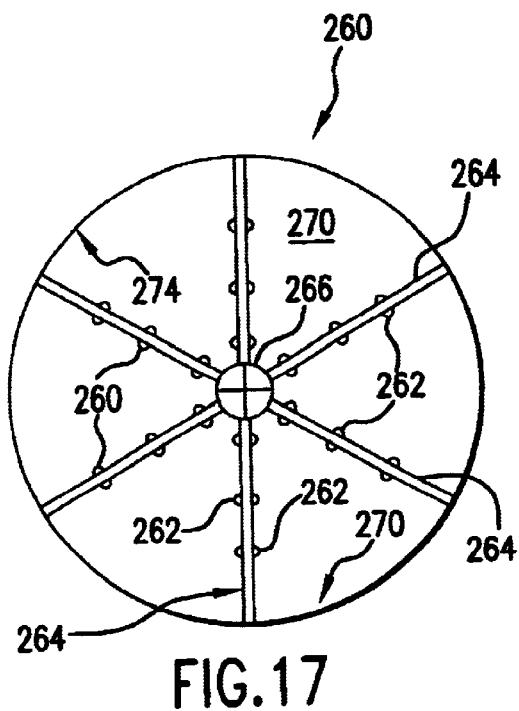
FIG. 17 is a schematic front elevation view of the illumination apparatus of FIG. 16.

Another alternative configuration of illumination device 260, incorporating the instant invention and for use with an imager such as imager 30, is shown in FIGS. 16 and 17. A plurality of unlensed LED's 262 (similar to the unlensed LED's described for previously described embodiments) are disposed on spokes 264 each secured proximate one end to a centrally disposed tube 266 and at their other ends to peripheral wall 268 of an illuminator 270. Spokes 264 may either be themselves coated with an electrically conductive material or substance to electrically interconnect LED's 262 or they may carry suitable electrically conductive strips or wires (not shown). LED's 262 are, electrically interconnected into one or more circuits and to suitable power and controls to effect the brightness and duration of illumination thereof.

LED's 262 are disposed to illuminate surface 272, 274 of illuminator 270 to provide efficient and diffuse "dark field" illumination in the direction of arrow F (FIG. 16) as described for the hereinabove previously described embodiments. Surface 274 casts light from LED's 262 to surface 272 from where it is reradiated outwardly to illuminate the symbology. The efficiency of surfaces 272, 274 is increased where they are slightly specular and smooth. Central tube 266 is to be aligned with the lenses of the camera engine and CCD image receiving device as described for the hereinabove described embodiments.

Figure 18:
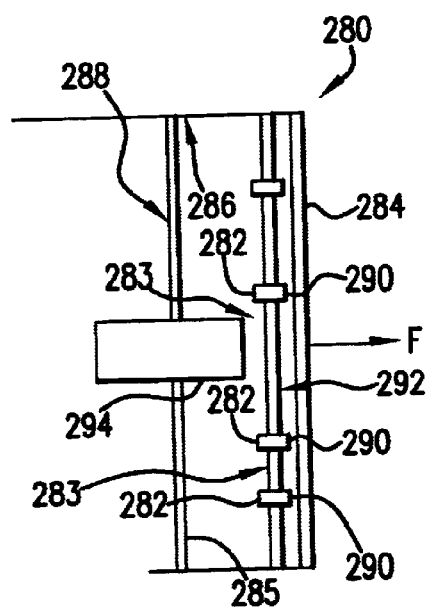
FIG. 18 is a schematic side view, in partial section, of yet still another embodiment of illumination apparatus, incorporating the instant invention, for use with the imager of FIGS. 1 and 2.
Figure 19:
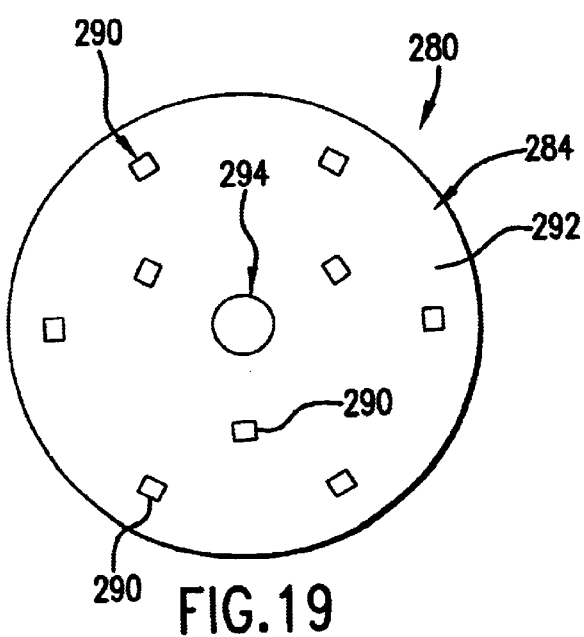
FIG. 19 is a schematic front elevation view of the illumination apparatus of FIG. 18.

Still another alternative configuration of illumination device 280, incorporating the instant invention and for use with an imager such as imager 30, is shown in FIGS. 18 and 19. A plurality of "dark field" unlensed LED's 282, are electrically interconnected and disposed in an array on a face 283 of an illumination carrier 284 which is a transparent disc of glass, plastic or the like. Illumination provided by LED's 282 coacts with surfaces 285, 286 of an illuminator 288 to provide efficient, diffuse illumination in the direction of arrow F (FIG. 18) as described for the hereinabove illuminator embodiments.

Surfaces 285, 286 are finished in either smooth red or white, rough chrome or matte finish red or white as described for the previously described illuminators and the cooperating LED's 282 provide a lambertian illumination for surfaces 285, 286.

An array of "bright field" LED's 290 are electrically connected together and disposed on a face 292 of illumination carrier 284, preferably in alignment with "dark field" unlensed LED's 282. A centrally disposed tube 294 extends through a rear wall of illuminator 288 to provide an open passage for light reflected off a target (not shown) and to the camera engine lenses and CCD image receiving device (not shown) such as those described above for the previously described embodiments.

Figure 20:
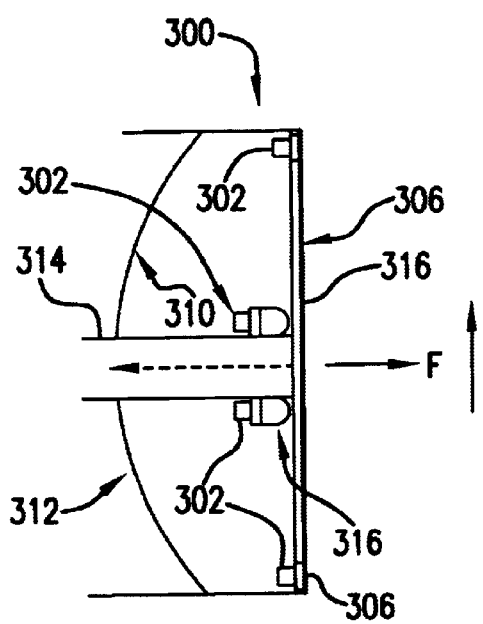
FIG. 20 is a schematic side elevation view, in partial section, of yet a further embodiment of illumination apparatus, incorporating the instant invention, for use with the imager of FIGS. 1 and 2.
Figure 21:
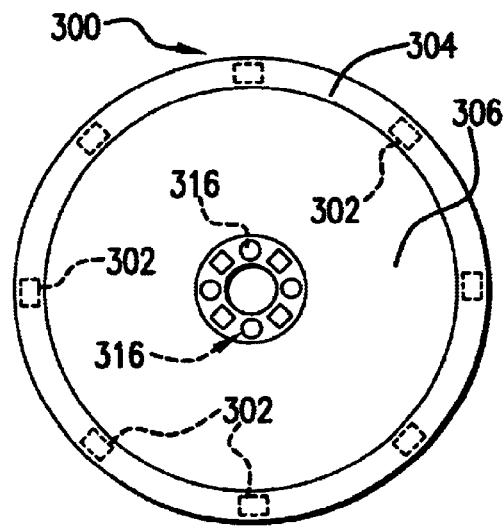
FIG. 21 is a schematic front elevation view of the illumination apparatus of FIG. 20.

A still further configuration and embodiment of illumination device 300, incorporating the instant invention and for use with an imager such as imager 30 is shown in FIGS. 20 and 21. A plurality of unlensed LED's 302 are carried by a peripheral ring 304 either carried by or disposed proximate a window 306 of transparent glass, plastic or the like. LED's 302 are electrically interconnected and conventionally electrically connected to a suitable source of electrical power and controls to control the amount and duration of illumination provided by LED's 302. If desired, ring 304 may be either electrically conductive or coated with an electrically conductive substance.

LED's 302 cast their illumination, in lambertian patterns towards and upon a surface 310 (FIG. 20) of an illuminator 312 which, in turn, projects efficient and highly diffuse dark field illumination in the direction of arrow F (FIG. 20). Surface 310 is finished in smooth red or white, rough chrome or matte finish white as described for the previously described illumination devices.

A centrally disposed tube 314 provides an open passage for light reflected from the target to be imaged (not shown) to the CCD or other image receiving device. A plurality of "bright field" illumination LED's 316 (FIGS. 20 and 21) are disposed about tube 314 to project their illumination in the direction of arrow F (FIG. 20). LED's 316 are electrically connected together and to a source of power and control for the amount and duration of illumination to be provided by LED's 316.

Figure 22:
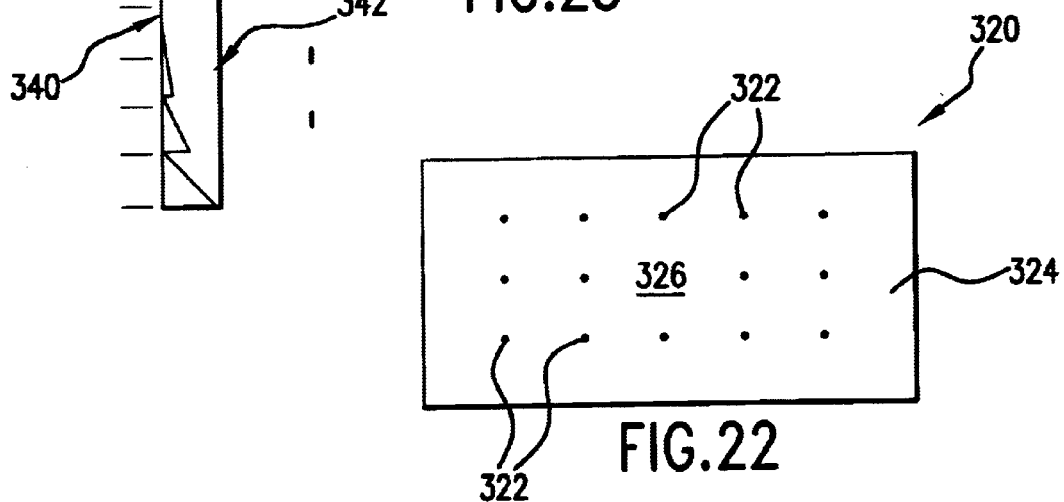
FIG. 22 is a schematic plan view of yet still another embodiment of illumination source, incorporating the instant invention, for use with a hand-held imager similar to that of FIGS. 1 and 2, but with a rectangular window.

FIG. 22 shows still another embodiment and configuration of illumination source 320 for use with an imager, such as imager 30, but one having a generally rectangular opening or window for its housing. A plurality of unlensed LED's 322 are disposed in a generally rectangular array on a carrier 324 of clear glass, plastic or the like. LED's 322 are electrically interconnected to each other and to a suitable and conventional source of power and to controls for controlling the amount of illumination and duration of illumination to be provided by same. The electrical connection provides one or more circuits with LED's providing lambertian illumination as described above. LED's 322 are not disposed on carrier 324 proximate a central portion 326 thereof to permit light reflected from targets (not shown) to pass through illumination carrier 324.

Figure 23:
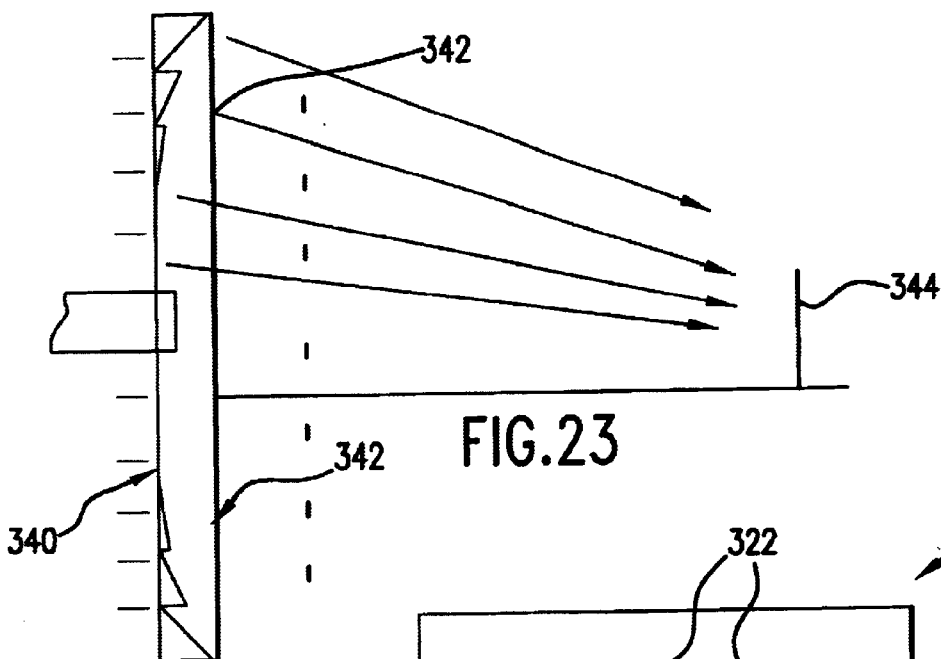
FIG. 23 is a schematic showing the illumination from and of the sources of illumination herein depicted and described, but cast upon an illuminator with a freznel-like surface.

In FIG. 23 there is shown an alternative configuration 340 for the base of the illuminators described in previous passages of this description. A fresnel-like surface 342 is provided for base 340 to direct the diffuse illumination towards a target, such as target 344. Fresnel surface 342 is finished in smooth red or white, rough chrome or matte finish white to provide an efficient and diffuse illumination for target 314.

In all of the embodiments of the illumination device it should be understood that although the color of the LED light sources has been referred to as "red" the illumination device could have been equally well manufactured using LED's of yellow, green or other color light output if the reflecting surface of the illuminator are white, chromed or of the same color as the LED source.

From the above description it will thus be seen that there has been provided new and improved devices for generating and projecting diffuse and highly efficient illumination from an imager, hand-held or otherwise, and accordingly new and improved imagers for capturing symbologies for interpretation and decoding. While hand-held imagers have generally been described it will be understood that the illumination devices, hereinabove described, may just as easily be utilized with stationary disposed imagers.

It is understood that although there has been shown and described preferred embodiments of the invention that various modifications may be made in details thereof without departing from the spirit as comprehended by the following claims.

What is claimed is:

1. A diffuse illumination apparatus to illuminate a target surface for electronic imaging of the target surface; comprising:

(a) illuminator means for projecting diffuse illumination in a predetermined configuration and in a predetermined direction; and
(b) illumination means for casting illumination upon said illuminator means;
(c) at least a portion of a surface of said illuminator means, when illumination from said illumination means is cast thereupon, projecting said diffuse illumination in said predetermined direction opposite to said first predetermined direction and upon the target surface;
(d) said illuminator means being substantially bowl-shaped with a bottom wall and a peripheral side wall extending from and encircling said bottom wall, an inner surface of said bottom wall and an inner surface of said peripheral side wall having a diffusing finish applied thereto to provide said diffuse illumination.

2. The illumination apparatus of claim 1 wherein said diffusing finish may be either matte white, smooth red or white or rough chrome.

3. The illumination apparatus of claim 2 wherein said illumination means includes a predetermined illumination emitting means carried by an illumination carrier disposed in proximity to and for cooperation with said illuminator means and so that said illumination emitting means is disposed to face and cast illumination upon said diffusing finish of said bottom wall surface and side wall surface of said illuminator means.

4. The illumination apparatus of claim 3 wherein said illumination emitting means icludes an array of LED,s.

5. The illumination apparatus of claim 4 wherein each LED is an unlensed LED and casts approximately lambertian illumination upon said illuminator means.

6. The illumination apparatus of claim 5 including electrical conductor means interconnecting said unlensed LED's into at least one electrical circuit.

7. The illumination apparatus of claim 6 wherein said electrical conductor means is applied to a surface of said illumination carrier.

8. The illumination apparatus of claim 7 wherein said electrical conductor means interconnects said unlensed LED's into at least two separate electrical circuits and wherein each such electrical circuit terminates in connectors for electrically connecting same to a source of electrical power and to control means for determining the brightness and duration of illumination of said illumination emitting means.

9. The illumination apparatus of claim 8 wherein said illumination emitting means and said illuminator means are disposed for coaction so that diffuse illumination projected from said illuminator means passes through said illumination carrier and about said illumination emitting means and electrical conductor means.

10. The illumination apparatus of claim 9 wherein said unlensed LED's and said electrical conductor means are sized and disposed so that when said diffuse illumination is projected from said illuminator, through said illumination carrier, shadows of said unlensed LED's and electrical conductor means appear smeared out in relation to a target when brought into focus to be imaged.

11. The illumination apparatus of claim 10 wherein there are twelve unlensed LED's spaced about a first circle carried by said illumination carrier and six unlensed LED's spaced about a second concentric circle carried by said illumination carrier and which is relatively smaller than said first circle of unlensed LED's.

12. The illumination apparatus of claim 10 wherein there are eight unlensed LED's spaced about a first circle carried by said illumination carrier and four unlensed LED's spaced about a second concentric circle carried by said illumination carrier and which is relatively smaller than said first circle of unlensed LED's.

13. The illumination apparatus of claim 10 wherein there are ten unlensed LED's spaced about a first circle carried by said illumination carrier and five unlensed LED's spaced about a second concentric circle carried by said illumination carrier and which is relatively smaller than said first circle of unlensed LED's.

14. The illumination apparatus of claim 3 wherein said illuminator means and said illumination means are sized and configured to be disposed in an electronic imager between an electronic image receiving device thereof and a front opening thereinto and so that light from images, reflected off a target to be imaged, passes along a predetermined image path through the illumination apparatus.

15. The illumination apparatus of claim 14 wherein said illuminator means includes an opening extending through a bottom wall thereof disposed in alignment with said predetermined image path and wherein said array of illumination emitting means is configured to provide a clear space through said illumination carrier for said predetermined image path.

16. The illumination apparatus of claim 3 wherein said illumination carrier includes a number of spoke-like ribs upon which said illumination emitting means are disposed.

17. The illumination apparatus of claim 3 wherein said illumination carrier includes a circular periphery and said illumination emitting means are carried by a circular ring disposed proximate said circular periphery.

18. The illumination apparatus of claim 3 wherein said illumination emitting means comprises a dark field illumination means and said illumination apparatus further includes a bright field illumination means including additional illumination emitting means which direct their illumination from said illumination carrier towards a target to be illuminated.

19. The illumination apparatus of claim 3 wherein said illumination emitting means comprises a dark field illumination means and said illumination apparatus further includes a bright field illumination means which directs its illumination from said illuminator means through said illumination carrier.

20. The illumination apparatus of claim 3 wherein said illumination carrier is substantially circular and of clear material.

21. The illumination apparatus of claim 3 wherein said illumination carrier is rectangular and of clear material.

22. The illumination apparatus of claim 3 wherein said bottom surface of said illuminator means has a freznel-like surface configuration facing towards said illumination carrier.

23. A method of providing diffuse illumination to illuminate a target surface for electronic imaging of the target surface; comprising:
(a) arranging a plurality of illumination emitting devices into an array and so that each such device, when energized, will cast its illumination in a predetermined direction;
(b) providing an illuminator with at least a first diffusing surface and positioning said illuminator so that said light diffusing surface receives illumination from said illumination emitting devices and projects diffuse light along a predetermined light path and in a second predetermined direction opposite to said first predetermined direction and to be toward where a target surface might be positioned for imaging.

24. A method of providing diffuse illumination to illuminate a target surface for electronic imaging of the target surface, comprising:
(a) arranging a plurality of illumination emitting devices into an array and so that each such device, when energized, will cast its illumination in a first predetermined direction;
(b) positioning said array of illumination emitting devices onto a clear illumination carrier;
(c) providing an illuminator with at least a first diffusing surface and positioning said illuminator so that said light diffusing surface receives illumination from said illumination emitting devices and projects diffuse light along a predetermined light path and in a second predetermined direction opposite to said first predetermined direction and to be toward where a target surface might be positioned for imaging.

25. A method of providing diffuse illumination to illuminate a target surface for electronic imaging of the target surface , comprising:
(a) arranging a plurality of illumination emitting devices into an array and so that each such device, when energized, will cast its illumination in a first predetermined direction; and
(b) providing an illuminator with at least a first diffusing surface and positioning said illuminator so that said light diffusing surface receives illumination from said illumination emitting devices and projects diffuse light along a predetermined light path which extends through said array of illumination emitting devices and in a second predetermined direction opposite to said first predetermined direction and to be toward where a target surface might be positioned for imaging.

26. The method of claim 25 including selecting said illumination emitting devices of a predetermined size and electrically interconnecting said illumination emitting devices with electrical conductors of predetermined size and material and positioning said illumination emitting devices and electrical conductors to minimize shadows upon a target and/or so that shadows thereof on a target will be out of focus and appear to be smeared when imaged.

27. The method of claim 26 including utilizing unlensed LED's without light directing components for said illumination emitting devices.

28. The method of claim 27 including utilizing nine unlensed LED's in a first circuit and nine unlensed LED's in a second circuit for said illumination devices array.

29. The method of claim 28 including selecting and positioning each said unlensed LED to provide lambertian illumination.

30. A method of providing diffuse illumination to illuminate a target surface for electronic imaging of the target surface, comprising:
(a) arranging a plurality of illumination emitting devices into an array and so that each such device, when energized, will cast its illumination in a first predetermined direction;
(b) providing an illuminator with at least a first diffusing surface and positioning said illuminator so that said light diffusing surface receives illumination from said illumination emitting devices and projects diffuse light along a predetermined light path and in a second predetermined direction opposite to said first predetermined direction and to be toward where a target surface might be positioned for imaging;
(c) utilizing said array of illumination emitting devices for dark field illumination; and
(d) providing a second array of illumination emitting devices for bright field illumination.

31. The method of claim 30 including positioning said second array of illumination emitting devices to cast their illumination in a second predetermined direction opposite to that of said first predetermined direction of said array of illumination emitting devices.

32. A method of providing diffuse illumination to illuminate a target surface for electronic imaging of the target surface, comprising:
(a) arranging a plurality of illumination emitting devices into an array and so that each such device, when energized, will cast its illumination in a first predetermined direction;
(b) providing an illuminator with at least a first diffusing surface and positioning said illuminator so that said light diffusing surface receives illumination from said illumination emitting devices and projects diffuse light along a predetermined light path and in a second predetermined direction opposite to said first predetermined direction and to be toward where a target surface might be positioned for imaging; and
(c) positioning said illuminator and said plurality of illumination emitting devices so that light reflected from a target will pass through said illuminator and illumination emitting devices.

33. The method of claim 32 including forming said illuminator with an opening and forming said array of illumination emitting devices with a spacing so that light reflected from a target may be transmitted therethrough.

34. An imager for electronically capturing and decoding data carrying symbology; comprising:
(a) housing means;
(b) CCD image receiving means disposed within said housing means;
(c) camera engine means disposed within said housing means to capture an image of symbology and present same to sa id CCD image receiving means;
(d) illumination apparatus including:
(i) illuminator means for projecting diffuse illumination in a predetermined configuration and in a predetermined direction;
(ii) illumination means for casting illumination upon said illuminator means; and
(iii) at least a portion of a surface of said illuminator means, when illumination from said illumination means is cast thereupon, projecting said diffuse illumination in said predetermined direction opposite to said first predetermined direction and upon the data carrying symbology, when disposed in proximity thereto, such that the data carrying symbology is presented to said camera engine means for capture thereby,
(e) said illuminator means being substantially bowl-shaped with a bottom wall and a peripheral side wall extending from and encircling said bottom wall, an inner surface of said bottom wall and an inner surface of said peripheral side wall having a diffusing finish applied thereto to provide diffuse illumination.

35. The imager of claim 34 wherein said diffusing finish may be either matte white, smooth red or white or rough chrome.

36. The imager of claim 35 wherein said illumination means includes a predetermined array of lambertian illumination emitting means carried by an illumination carrier disposed in proximity to and for cooperation with said illuminator means and so that said illumination emitting means are disposed to face and cast their respective lambertian illumination upon said diffusing finish of said bottom wall surface and side wall surface of said illuminator.

37. The imager of claim 36 wherein each said illumination emitting means is an LED.

38. The imager of claim 37 wherein each LED is an unlensed LED.

39. The imager of claim 38 including electrical conductor means interconnecting said unlensed LED's into at least one electrical circuit.

40. The imager of claim 39 wherein said electrical conductor means is applied to a surface of said illumination carrier.

41. The imager of claim 40 wherein said electrical conductor means interconnects said unlensed LED's into at least two separate electrical circuits and wherein each such electrical circuit terminates in connectors for electrically connecting same to a source of electrical power and to control means for determining the brightness and duration of illumination of said illumination emitting means.

42. The imager of claim 41 wherein said illumination emitting means and said illuminator means are disposed for co-action so that diffuse illumination projected from said illuminator means passes through said illumination carrier and about said illumination emitting means and electrical conductor means.

43. The imager of claim 42 wherein said unlensed LED's and said electrical conductor means are sized and disposed so that when said diffuse illumination is projected from said illuminator through said illumination carrier shadows of said unlensed LED's and electrical conductor means appear smeared out in relation to a target when brought into focus to be imaged.

44. The imager of claim 43 wherein there are twelve unlensed LED's spaced about a first circle carried by said illumination carrier and six unlensed LED's spaced about a second concentric circle carried by said illumination carrier and which is relatively smaller than said first circle of unlensed LED's.

45. The imager of claim 43 wherein there are eight unlensed LED's spaced about a first circle carried by said illumination carrier and four unlensed LED's spaced about a second concentric circle carried by said illumination carrier and which is relatively smaller than said first circle of unlensed LED's.

46. The imager of claim 43 wherein there are ten unlensed LED's spaced about a first circle carried by said illumination carrier and five unlensed LED's spaced about a second concentric circle carried by said illumination carrier and which is relatively smaller than said first circle of unlensed LED's.

47. The imager of claim 36 wherein said illuminator means and said illumination means are sized and configured to be disposed in the imager between said CCD image receiving means thereof and a front opening thereinto and so that images reflected off a target to be imaged pass along a predetermined image path through the illumination apparatus.

48. The imager of claim 47 wherein said illuminator means includes an opening extending through a bottom wall thereof disposed in alignment with said predetermined image path and wherein said array of illumination emitting means is configured to provide a clear space through said illumination carrier for said predetermined image path.

49. The imager of claim 36 wherein said illumination carrier includes a number of spoke-like ribs upon which said illumination emitting means are disposed.

50. The imager of claim 36 wherein said illumination carrier includes a circular periphery and said illumination emitting means are disposed in a circular ring disposed proximate said circular periphery.

51. The imager of claim 36 wherein said illumination emitting means comprises a dark field illumination means and said illumination apparatus further includes a bright field illumination means including additional illumination emitting means which direct their illumination from said illumination carrier towards where a target would be disposed to be illuminated.

52. The imager of claim 36 wherein said illumination emitting means comprises a dark field illumination means and said illumination apparatus further includes a bright field illumination means which directs its illumination from said illuminator means through said illumination carrier.

53. The imager of claim 36 wherein said illumination carrier is substantially circular and of clear material.

54. The imager of claim 36 wherein said illumination carrier is rectangular and of clear material.

55. The imager of claim 36 wherein said bottom surface of said illuminator means has a freznel-like surface configuration facing towards said illumination carrier.

56. A diffuse illumination apparatus for illuminating a target surface for electronic imaging of the target surface, comprising:
  (a) a plurality of illumination emitting devices arranged into an array and so that each such device, when energized, will cast its illumination in a first predetermined direction; and
  (b) an illuminator having at least a first light diffusing surface and being positioned so that said light diffusing surface receives illumination from said illumination emitting devices and projects diffuse light along a predetermined light path which extends through said array of illumination emitting devices and in a second predetermined direction opposite to said first predetermined direction and toward where a target surface might be positioned for imaging.

57. The apparatus of claim 56 wherein said illumination emitting devices are of a predetermined size and are electrically interconnected with electrical conductors of predetermined size and material and are selectively positioned to minimize shadows upon a target and/or so that shadows thereof on a target will be out of focus and appear to be smeared when imaged.

58. The apparatus of claim 57 wherein said illumination emitting devices are unlensed LED's without light directing components.

59. The apparatus of claim 58 wherein nine unlensed LED's in a first circuit and nine unlensed LED's in a second circuit are utilized for said illumination devices array.

60. The apparatus of claim 59 wherein each said unlensed LED is selected and positioned to provide lambertian illumination.

61. The apparatus of claim 56 wherein said array of illumination emitting devices are positioned onto a clear illumination carrier.

62. The apparatus of claim 56 wherein said array of illumination emitting devices may be utilized for dark field illumination and a second array of illumination emitting devices are provided for bright field illumination.

63. The apparatus of claim 62 wherein said second array of illumination emitting devices are positioned to cast their illumination in a second predetermined direction opposite to that of said first predetermined direction of said array of illumination emitting devices.

64. The apparatus of claim 56 wherein said illuminator and said plurality of illumination emitting devices are positioned so that light reflected from a target will pass through said illuminator and illumination emitting devices.

65. The apparatus of claim 64 wherein said illuminator is formed with an opening and said array of illumination emitting devices are arranged with a spacing so that light reflected from a target may be transmitted therethrough.

66. A diffuse illumination apparatus to illuminate a target surface for electronic imaging of the target surface, comprising:

(a) illumination means; and (b) illuminator means positioned to receive upon a surface thereof illumination from said illumination means;

(c) at least a portion of said surface of said illuminator means, when illumination from said illumination means is received thereupon, diffusing said illumination and projecting said diffuse illumination in a predetermined direction;

(d) said illumination means directing its illumination towards said illuminator means and in an illumination direction opposite to said predetermined direction to illuminate a target surface when disposed in proximity thereto.

67. An imager for electronically capturing and decoding data carrying symbology; comprising:

(a) housing means;

(b) CCD image receiving means disposed within said housing means;

(c) camera engine means disposed within said housing means to capture an image of symbology and present same to said CCD image receiving means; and (d) illumination apparatus including:

(i) illumination means;

(ii) illuminator means positioned to receive upon a surface thereof illumination from said illumination means;

(iii) at least a portion of said surface of said illuminator means, when illumination from said illumination means is received thereupon, diffusing said illumination and projecting said diffuse illumination in a predetermined-direction and upon the data carrying symbology, when disposed in proximity thereto, such that the data carrying symbology is presented to said camera engine means for capture thereby;

(iv) said illumination means directing its illumination towards said illuminator means and in an illumination direction opposite to said predetermined direction.

* * * * *